(12) United States Patent
Wang

(10) Patent No.: US 10,897,671 B2
(45) Date of Patent: Jan. 19, 2021

(54) 5GHZ MULTICHANNEL LOSSLESS WIRELESS AUDIO SYSTEM

(71) Applicant: Fengshuo Wang, Guangdong (CN)

(72) Inventor: Fengshuo Wang, Guangdong (CN)

(*) Notice: Subject to any disclaimer, the term of this patent is extended or adjusted under 35 U.S.C. 154(b) by 211 days.

(21) Appl. No.: 16/300,934

(22) PCT Filed: Oct. 24, 2016

(86) PCT No.: PCT/CN2016/103079
§ 371 (c)(1),
(2) Date: Nov. 12, 2018

(87) PCT Pub. No.: WO2018/076140
PCT Pub. Date: May 3, 2018

(65) Prior Publication Data
US 2020/0322726 A1    Oct. 8, 2020

(51) Int. Cl.
| | | |
|---|---|---|
| *H04R 3/12* | (2006.01) | |
| *G06F 3/16* | (2006.01) | |
| *G08C 23/04* | (2006.01) | |
| *G10L 19/00* | (2013.01) | |
| *G10L 19/008* | (2013.01) | |

(52) U.S. Cl.
CPC .............. *H04R 3/12* (2013.01); *G06F 3/162* (2013.01); *G08C 23/04* (2013.01); *G10L 19/008* (2013.01); *G10L 19/0017* (2013.01); *H04R 2420/01* (2013.01); *H04R 2420/07* (2013.01); *H04R 2420/09* (2013.01)

(58) Field of Classification Search
CPC .. H04R 3/12; H04R 2420/01; H04R 2420/07; H04R 2420/09; G10L 19/0017; G10L 19/008; G06F 3/162; G08C 23/04
See application file for complete search history.

(56) References Cited

U.S. PATENT DOCUMENTS

| | | | | |
|---|---|---|---|---|
| 9,444,565 | B1* | 9/2016 | Leopardi | H04L 65/60 |
| 2007/0015485 | A1* | 1/2007 | DeBiasio | H04B 1/082 |
| | | | | 455/345 |
| 2008/0168312 | A1* | 7/2008 | Banks | G10L 19/005 |
| | | | | 714/39 |
| 2016/0041808 | A1* | 2/2016 | Pelland | H04R 3/00 |
| | | | | 381/123 |
| 2016/0212528 | A1* | 7/2016 | Wang | H04R 3/00 |
| 2016/0309269 | A1* | 10/2016 | Peters | H04N 21/44209 |
| 2017/0142535 | A1* | 5/2017 | Aggarwal | H04L 65/4092 |

FOREIGN PATENT DOCUMENTS

| | | | |
|---|---|---|---|
| CN | 102694584 A | * 9/2012 | |
| CN | 105302756 A | * 2/2016 | |
| WO | WO-2009117914 A1 | * 10/2009 | H04R 5/02 |

* cited by examiner

Primary Examiner — David L Ton

(57) ABSTRACT

A 5 GHz multichannel lossless wireless audio system, having a transmitter (1) and multiple receivers (2), the transmitter (1) consists of a main signal processing portion (11), a 5G wireless transmitting portion (12), a first single chip portion (13), a LED indicating and displaying portion (14), and a first power supply portion (15). Each receiver (2) consists of a a 5G wireless receiving portion (21), a digital/analog conversion and power amplifying portion (22), a second single chip portion (23), a LED indicating panel portion (24), and a second power supply portion (25).

10 Claims, 3 Drawing Sheets

5GHZ MULTICHANNEL LOSSLESS WIRELESS AUDIO SYSTEM

BACKGROUND OF THE INVENTION

The present invention relates to the technical field of acoustics, and more specifically relates to a 5 GHz multichannel lossless wireless audio system.

Wireless communication technology has been developing for many years. Both Bluetooth® and Wi-Fi are limited by the speed and stability of data transmission and also by transmission distance. Transmission of high-performance lossless audio data is always dissatisfactory. Analog audio and digital audio are the two common types of existing wireless audio technology. Wireless analog audio includes FM frequency modulation, AM amplitude modulation, and infrared etc. Analog audio is generally susceptible to signal interference and instability. There are countless Wi-Fi and Bluetooth® devices in each building operating within a 2.4G band. A crowded 2.4G band often causes frequent interference of wireless audio transmission. Wireless digital audio includes Bluetooth®, Wi-Fi, Air Play run by Apple system, and DLNA run by Android system etc, and these digital audio belong to the field of 2.4 GHz wireless audio technology. 2.4 GHz wireless audio technology solves the problem of difficult and time consuming wire arrangements, and thus reduces installation and maintenance costs, thereby possessing advantageous characteristics of broad application range, high bandwidth and low power consumption. However, due to large-scale selection of the 2.4 GHz (2.4-2.484 GHz) ISM band, the problem of electromagnetic compatibility in this band is serious. Mutual interference of the signals causes the wireless audio transmission to pause or to be intermittent, and the channel switching and interface of the existing system are relatively simple. There are also problems of unstable audio signal, low quality, and matching problem between a transmitter and a receiver to achieve two-way communication and cooperation, also, there are lengthy and cumbersome wireless connection procedures and the problem of difficult wire arrangement.

BRIEF SUMMARY OF THE INVENTION

In view of the aforesaid disadvantages now present in the prior art, the present invention provides a 5 GHz multichannel lossless wireless audio system that can overcome the disadvantages of the existing prior arts and solve the existing problems in multichannel lossless audio data transmission while ensuring stability and high quality of transmitted audio signals.

The present invention is achieved according to the following technical solution: A 5 GHz multichannel lossless wireless audio system, formed by a transmitter and multiple receivers, wherein:

the transmitter comprises a main signal processing portion, a 5G wireless transmitting portion, a first single chip portion, a LED indicating and displaying panel portion, and a first power supply portion, wherein the main signal processing portion comprises a universal interface unit, a digital audio processing unit, a multichannel analog input unit, a multichannel ADC, a first high speed multiway switch, and a second high speed multiway switch; the universal interface unit comprises a coaxial input interface, a surface panel optical fiber input interface, a rear panel optical fiber input interface, AES/EBU digital input interface, Bluetooth® antenna, USB input interface and TYPE-C input interface; the digital audio processing unit comprises a digital audio receiving module and an asynchronous sampling rate conversion module; an output end of the multichannel analog input unit is connected to an input end of the multichannel ADC; control ports of the first single chip portion are respectively connected to control ports of the TYPE-C input interface, the digital audio receiving module, the asynchronous sampling rate conversion module, and the 5G wireless transmitting portion; the LED indicating and displaying panel portion and the first power supply portion are respectively connected to the first single chip portion; the coaxial input interface, the surface panel optical fiber input interface, the rear panel optical fiber input interface, the AES/EBU digital input interface and the TYPE-C input interface are respectively connected to an input interface of the digital audio receiving module; the Bluetooth® antenna and an output interface of the digital audio receiving module are simultaneously connected to the first high speed multiway switch; the USB input interface has two signal output ends, one of which is connected to the first high speed multiway switch, and another one of which is connected to the asynchronous sampling rate conversion module; an output end of the asynchronous sampling rate conversion module and an output end of the multichannel ADC are simultaneously connected to the second high speed multiway switch; an output end of the second high speed multiway switch is connected to the 5G wireless transmitting portion;

a receiver comprises a 5G wireless receiving portion, a digital/analog conversion and power amplifying portion, a second single chip portion, a LED indicating panel portion, and a second power supply portion; the digital/analog conversion and power amplifying portion comprises a third high speed multiway switch, a digital/analog signal converter with volume control, a low speed filter buffer unit, an analog switch, a power amplification module, a RCA single-end analog signal output interface, a XLR balanced analog audio input interface and a speaker; the 5G wireless receiving portion is wirelessly connected to the 5G wireless transmitting portion via a 5 GHz signal; the 5G wireless receiving portion is connected to the digital/analog signal converter with volume control; an analog volume output interface of the digital/analog signal converter with volume control is connected to the low speed filter buffer unit; the low speed filter buffer unit has two output ends, one of which is connected to the RCA single-end analog signal output interface, and another one of which and the XLR balanced analog audio input interface are simultaneously connected to the analog switch; an output end of the analog switch is connected to the power amplifying module; a speaker output interface of the power amplifying module is connected to the speaker; control ports of the second single chip portion are respectively connected to control ports of the 5G wireless receiving portion and the digital/analog conversion and power amplifying portion; the LED indicating panel portion and the second power supply portion are respectively connected with the second single chip portion.

The USB input interface is a USB 2.0 interface or a USB 3.0 interface.

The 5G wireless transmitting portion comprises a baseband portion, a digital cache portion, a 5 GHz radio frequency portion, and 5 GHz duplex dual antenna transmission signals.

The multichannel analog input unit comprises a multichannel analog interface and a buffer amplifier.

The first single chip portion comprises a first system control microprocessor, and a 2/8CH switch, an infrared remote control unit and a first remote control interface connected respectively to the first system control microprocessor.

The LED indicating and displaying panel portion comprises a status display unit and a volume control and display unit, wherein the status display unit is connected to the first single chip portion; the volume control and display unit comprises a volume knob, a shift register, and an LED digital display screen; the volume knob is connected to the first single chip portion; the shift register and the LED digital display screen are connected to the first single chip portion through the shift register.

The Bluetooth® antenna is connected to the first high speed multiway switch through a Bluetooth® module; the USB input interface is respectively connected to the first high speed multiway switch and the asynchronous sampling rate conversion module through a USB interface conversion chip.

The power amplification module has a power of 200 W.

The second single chip portion comprises a second system control microprocessor, and a local attenuation control unit, a channel setting unit, a human-machine interaction component, an infrared remote control receiving interface, an infrared remote control switch, a 12V output switch control unit and a second remote control interface respectively connected to the second system control microprocessor, wherein the infrared remote control switch is connected to the infrared remote control receiving interface.

The LED indicating panel portion comprises a 48-192 khz sampling rate indicating unit and a wireless signal indicating unit simultaneously connected to the second single chip portion.

The present invention has the following beneficial effects: the present invention supports 2-8CH of multichannel real-time and lossless transmission to achieve supreme level of wireless audio technology and system. The system enables the transmitter to directly connect Mac/PC, DAP, Blu-ray device, CD, iPhone, iPad for easy connection and pairing without using a Wi-Fi network or a router; the wireless power amplifiers can receive and decode data and carry out high-performance audio amplification. When used in a stereo system or a multichannel and customized installation system of a home theater, the present invention can operate as long as there is a power supply, thereby eliminating the cumbersome wire arrangements and completely solving the wiring problem of the system. Hence, the present invention can solve the existing problems in multichannel lossless audio data transmission while ensuring stability and high quality of transmitted audio signals.

Reference signs in the figures: 1—transmitter; 2—receivers; 12—5G wireless transmitting portion; 13—first single chip portion; 14—LED indicating and displaying panel portion; 15—first power supply portion; 111—universal interface unit; 112—digital audio processing unit; 113—multichannel analog input unit; 114—multichannel ADC; 115—first high speed multiway switch; 116—second high speed multiway switch; 1121—digital audio receiving module; 1122—asynchronous sampling rate conversion module; 21—5G wireless receiving portion; 22—digital/analog conversion and power amplifying portion; 23—second single chip portion; 24—LED indicating panel portion; 25—second power supply portion; 221—third high speed multiway switch; 222—digital/analog signal converter with volume control; 223—low speed filter buffer unit; 224—analog switch; 225—power amplification module; 131—first system control microprocessor; 132—2/8CH switch; 133—infrared remote control unit; 134—first remote control interface; 141—status display unit; 142—volume control and display unit; 231—second system control microprocessor; 232—local attenuation control unit; 233—channel setting unit; 234—human-machine interaction component; 235—infrared remote control receiving interface; 236—infrared remote control switch; 237—12V output switch control unit; 238—second remote control interface.

DETAILED DESCRIPTION OF THE INVENTION

The technical solution of the present invention will be further described in detail below with reference to the accompanying drawings. However, the scope of protection of the present invention should not be limited to the following detailed description.

Figure 1:
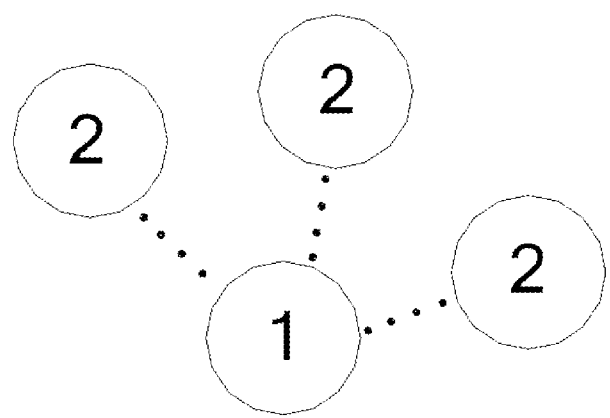
FIG. 1 is a structural view of the present invention.
Figure 2:
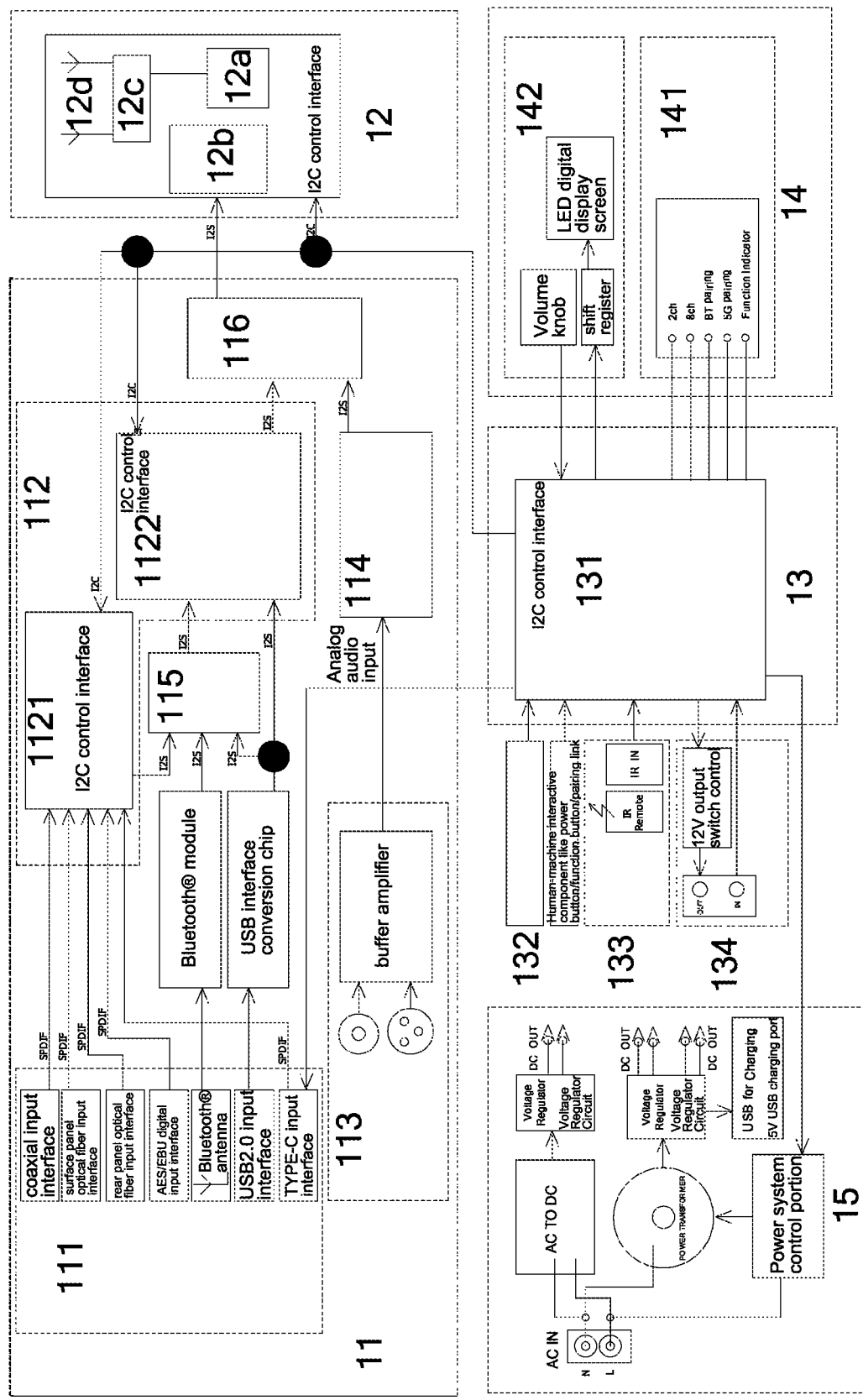
FIG. 2 is a structural view of the transmitter of the present invention.

As shown in FIG. 1, a 5 GHz multichannel lossless wireless audio system is formed by a transmitter 1 and multiple receivers 2, wherein:

As shown in FIG. 2, the transmitter 1 comprises a main signal processing portion 11, a 5G wireless transmitting portion 12, a first single chip portion 13, a LED indicating and displaying panel portion 14, and a first power supply portion 15, wherein the main signal processing portion 11 comprises a universal interface unit 111, a digital audio processing unit 112, a multichannel analog input unit 113, a multichannel ADC 114, a first high speed multiway switch 115, and a second high speed multiway switch 116; the universal interface unit 111 comprises a coaxial input interface, a surface panel optical fiber input interface, a rear panel optical fiber input interface, AES/EBU digital input interface, Bluetooth® antenna, USB input interface and TYPE-C input interface; the digital audio processing unit 112 comprises a digital audio receiving module 1121 and an asynchronous sampling rate conversion module 1122; an output end of the multichannel analog input unit 113 is connected to an input end of the multichannel ADC 114; control ports of the first single chip portion 13 is respectively connected to control ports of the TYPE-C input interface, the digital audio receiving module 1121, the asynchronous sampling rate conversion module 1122, and the 5G wireless transmitting portion 12; the LED indicating and displaying panel portion 14 and the first power supply portion 15 are respectively connected to the first single chip portion 13; the coaxial input interface, the surface panel optical fiber input interface, the rear panel optical fiber input interface, the AES/EBU digital input interface and the TYPE-C input interface are respectively connected to an input interface of the digital audio receiving module 1121; the Bluetooth® antenna and an output interface of the digital audio receiving module 1121 are simultaneously connected to the first high speed multiway switch 115; the USB input interface has two signal output ends, one of which is connected to the first high speed multiway switch 115, and another one of which is connected to the asynchronous sampling rate conversion module 1122; an output end of the asynchronous sampling rate conversion module 1122 and output end of the multichannel ADC 114 are simultaneously connected to the second high speed multiway switch 116; an output end of the second high speed multiway switch 116 is connected to the 5G wireless transmitting portion 12.

Figure 3:
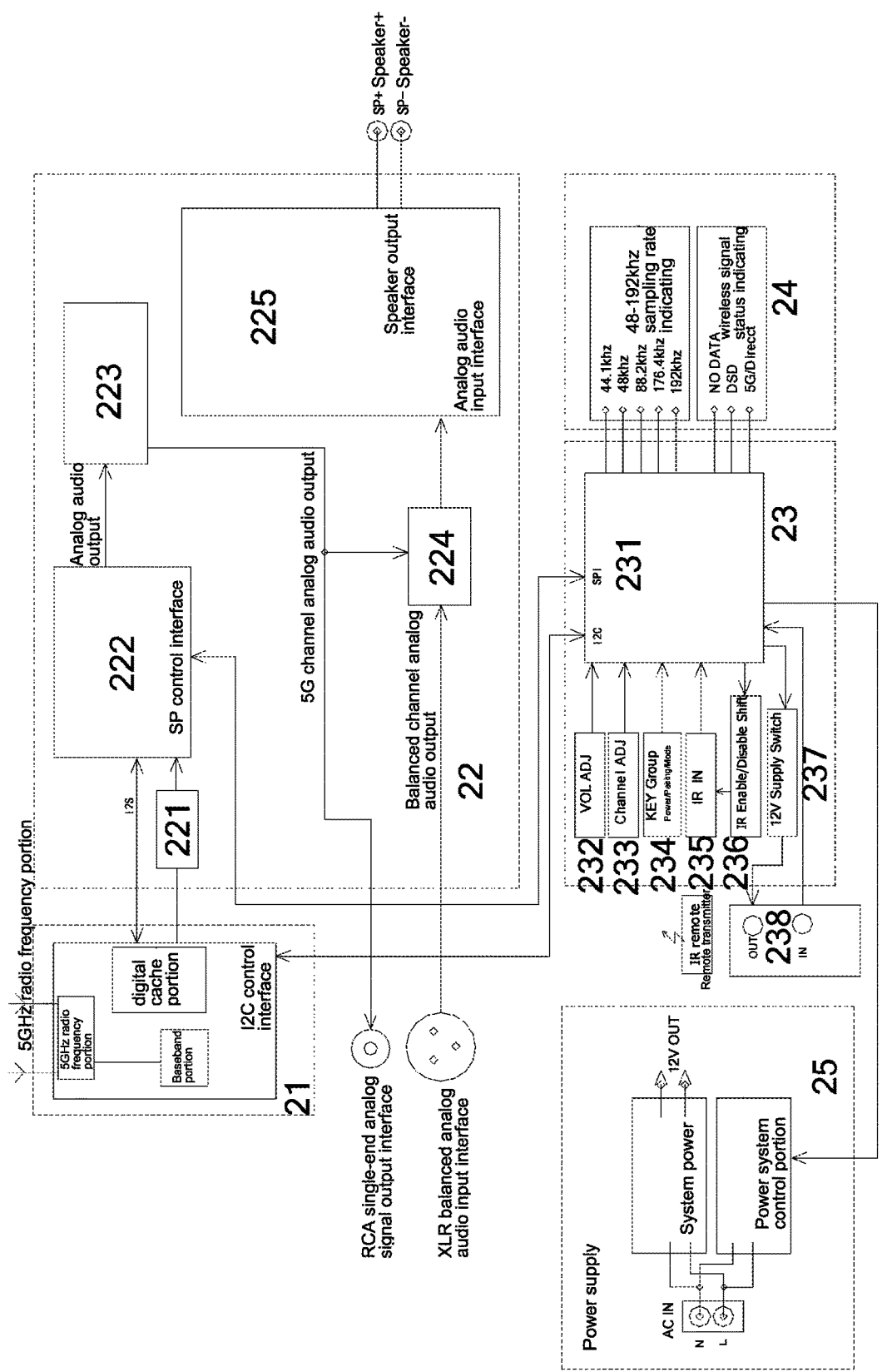
FIG. 3 is a structural view of a receiver of the present invention.

As shown in FIG. 3, a receiver 2 comprises a 5G wireless receiving portion 21, a digital/analog conversion and power amplifying portion 22, a second single chip portion 23, a LED indicating panel portion 24, and a second power supply portion 25; the digital/analog conversion and power amplifying portion 22 comprises a third high speed multiway switch 221, a digital/analog signal converter 222 with volume control, a low speed filter buffer unit 223, an analog switch 224, a power amplification module 225, a RCA single-end analog signal output interface, a XLR balanced analog audio input interface and a speaker; the 5G wireless receiving portion 21 is wirelessly connected to the 5G wireless transmitting portion 12 via a 5 GHz signal; the 5G wireless receiving portion 21 is connected to the digital/analog signal converter 222 with volume control; an analog volume output interface of the digital/analog signal converter 222 with volume control is connected to the low speed filter buffer unit 223; the low speed filter buffer unit 223 has two output ends, one of which is connected to the RCA single-end analog signal output interface, and another one of which and the XLR balanced analog audio input interface are simultaneously connected to the analog switch 224; an output end of the analog switch 224 is connected to the power amplifying module 225; a speaker output interface of the power amplifying module 225 is connected to the speaker; control ports of the second single chip portion 23 are respectively connected to control ports of the 5G wireless receiving portion 21 and the digital/analog conversion and power amplifying portion 22; the LED indicating panel portion 14 and the second power supply portion 25 are respectively connected with the second single chip portion 23.

The transmitter 1 is a multichannel transmitter, which apart of having a complete collection of interfaces and a complete signal link for transmitting 5 GHz signals, is also a control and communication center of the system. In addition to transmitting audio signals, a 5 GHz RF channel also handles communication, control, and synchronization issues for the entire system in a full-duplex mode. The main signal processing portion 11 supports audio interface and hardware for 8-way direct input of I2S audio data, thereby maximally supporting up to 8-way signal inputs, which is convenient to interface with signal source already converted to standard I2S; the multichannel analog input unit 113 prepares for subsequent ADC digitalization, and can maximally support up to 8-way analog signal inputs; the multichannel ADC 114 maximally supports up to 8 channels to digitalize 8 channels of analog signals and convert them to I2S signals, so as to prepare for switching operation of the second high speed multiway switch 116. The second high speed multiway switch 116 completes switching of plurality of input signal sources and number of channels through a first system control microprocessor 131, and then notifies the receivers and the system. The first system control microprocessor 131 is used for system operation control, human-machine interactive information processing, and full-system synchronization of the transmitter and the receivers; a volume control and display unit 142 is used for volume control of the digital domain of the entire system according to the scale of dB unit, and remembers the volume when the power is turned off; all receivers communicate by full-duplex communication and synchronize with system volume; a status display unit 141 indicates a current communication status of the system through an LED; an infrared remote control unit 133 is one of the entrances of the human-machine interaction, and will be automatically synchronized by the system; a 2/8CH switch 132 can implement 2-channel and 8-channel switch. In a 2-channel mode, the 5 GHz multichannel lossless wireless audio system turns off the multichannel channel path, to ensure sufficient bandwidth for 2-channel channel path transmission. In this mode, the transmitter's stereo left and right channels can be connected to multiple receivers at the same time, to easily set up a multichannel speaker system to increase capacity. Alternatively, when using a multiway frequency-dividing Hi-Fi speaker, in order to upgrade the drive of one side (left/right channel), 2 groups (2 wireless power amplifiers) or 3 ways (3 wireless power amplifiers) may be used to drive high, medium and low frequency units respectively, so that the capacity of each channel is instantly increased by 2 times or 3 times, such an ultimate multichannel frequency-dividing system is used for top-level high-fidelity sound. When switching to 8-channel mode, multichannel audio signals can be transmitted; a first remote control interface 134 is used for system remote control and can be connected to smart home system; the digital audio receiving module 1121 comprises preliminary conversion processing of coaxial optical fiber signals, receipt and processing of USB audio signals etc., and notification to the parts the current data status of the first system control microprocessor 131; the asynchronous sampling rate conversion module 1122 performs sampling rate conversion of input digital signals.

In the receiver 2, the 5G wireless receiving portion 21 comprises a 5 GHz radio frequency portion, a baseband portion, a digital buffer portion, and a 5 GHz duplex dual antenna; the 5 GHz radio frequency portion receives a 5.2 or 5.8 GHz signal via radio frequency components and performs preprocessing. The baseband portion comprises preliminary processing of digital audio signals, and I2C status and communication control of communication parts. A digital cache portion is an asynchronous FIFO cache and digital PLL, combined with communication software control, to achieve stable data transmission and ultra-low latency. The 5 GHz duplex dual antenna is used to receive audio data and return status signals.

The third high speed multiway switch 221 selects and switches received multichannel digital audio signals according to the setting of the system; the digital/analog signal converter (DAC) 222 with volume control converts the received digital audio signals into analog signals, and adjusts the volume in the digital domain according to the setting of the system, or attenuate the local signal according to the setting; the low speed filter buffer unit 223 preprocesses the analog signals output by the DAC; the analog switch 224 switches the analog signals processed by the DAC or local analog signals of (DIRECT or AUX) mode; the power amplification module 225 amplifies the power of the analog signals to drive the speaker; a second system control microprocessor 231 is used to control system operation, process human-machine interactive information, and synchronize the entire system of the transmitter and the receivers; a 48-192 khz sampling rate indicating unit 241 displays the signals received by the receivers to indicate a current sampling rate status; a wireless signal indicating unit 242 indicates a current connection and signal status; a local attenuation control unit 232 fine tunes the output power of each receiver based on specific application environment; a channel setting unit 233 sets the specific channels of the receiver for receiving and operating according to use requirements, to satisfy the setting of multiple channels formed by multiple receivers; a human-machine interaction component 234 comprises buttons and switches, etc.; an infrared remote control receiving interface 235 can transmit control signals to the transmitter and synchronize the entire system (including all paired receivers) through a remote receiver and through the system's full-duplex mechanism by using a remote control; a second remote control interface 238 is used for system remote control; the second power supply portion 25 comprises system power and a power system control portion.

According to an actual number of channels being used, a corresponding number of receivers are paired with the channels, and after pairing by button pressing, a multichannel audio system can be built.

The USB input interface is a USB 2.0 interface or a USB 3.0 interface.

The 5G wireless transmitting portion 12 comprises the baseband portion 12a, the digital cache portion 12b, the 5 GHz radio frequency portion 12c, and 5 GHz duplex dual antenna transmission signals 12d. The baseband portion 12a comprises preliminary processing of digital audio signals, and I2C status and communication control of communication parts etc. the digital cache portion 12b comprises asynchronous FIFO cache and digital PLL, combined with communication software control, to achieve stable data transmission and ultra-low latency. The 5 GHz radio frequency portion 12c amplifies a 5.2 or 5.8 GHz signal via radio frequency amplification.

The multichannel analog input unit 113 comprises a multichannel analog interface and a buffer amplifier.

The first single chip portion 13 comprises the first system control microprocessor 131 and the 2/8CH switch 132, the infrared remote control unit 133 and the first remote control interface 134 connected respectively to the first system control microprocessor 131.

The LED indicating and displaying panel portion 14 comprises the status display unit 141 and the volume control and display unit 142, wherein the status display unit 141 is connected to the single chip portion 13, and the volume control and display unit 142 comprises a volume knob, a shift register, and an LED digital display screen; the volume knob is connected to the single chip portion 13; the shift register and the LED digital display screen are connected to the single chip portion 13 through the shift register.

The Bluetooth® antenna is connected to the first high speed multiway switch 115 through a Bluetooth® module; the USB input interface is respectively connected to the first high speed multiway switch 115 and the asynchronous sampling rate conversion module 1122 through a USB interface conversion chip.

The power amplification module 225 has a power of 200 W.

The second single chip portion 23 comprises the second system control microprocessor 231, and the local attenuation control unit 232, the channel setting unit 233, the human-machine interaction component 234, the infrared remote control receiving interface 235, the infrared remote control switch 236, a 12V output switch control unit 237 and the second remote control interface 238 respectively connected to the second system control microprocessor 231, wherein the infrared remote control switch 236 is connected to the infrared remote control receiving interface 235.

The LED indicating panel portion 24 is comprises the 48-192 khz sampling rate indicating unit 241 and the wireless signal indicating unit 242 simultaneously connected to the second single chip portion 23.

The multichannel lossless wireless audio system of the present invention uses 5 GHz ISM frequency band and utilizes advanced pure digital radio frequency technology to solve the ultra-high stability problem that cannot even be solved by Bluetooth® and Wi-Fi. The present invention supports 2-8CH of multichannel real-time and lossless transmission to achieve supreme level of wireless audio technology and system. The present invention comprises a transmitter and multiple receivers or wireless power amplifiers, forming a multichannel wireless audio system. The system enables the transmitter to directly connect Mac/PC, DAP, Blu-ray device, CD, iPhone, iPad for easy connection and pairing without using a Wi-Fi network or a router; the wireless power amplifiers can receive and decode data and carry out high-performance audio amplification. When used in a stereo system or a multichannel and customized installation system of a home theater, the present invention can operate as long as there is a power supply, thereby eliminating the cumbersome wire arrangements and completely solving the wiring problem of the system.

Only the preferred embodiment of the present invention is described above. It should be understood that the present invention should not be limited to the above description. The above description should not be considered excluding other possible embodiments. The present invention is adaptable to other combinations, modifications and other environments of embodiments conceivable within the scope of the present invention and in accordance with the teachings of the present invention or the technique or knowledge known in the related field of art. Any changes or amendments of the present invention made by a skilled person in the art without deviating from the essence and scope of the present invention should fall within the scope of protection of the present invention as defined in the claims.

What is claimed is:

1. A 5 GHz multichannel lossless wireless audio system, formed by a transmitter and multiple receivers, wherein:
the transmitter comprises a main signal processing portion, a 5G wireless transmitting portion, a first single chip portion, a Light Emitting Diode (LED) indicating and displaying panel portion, and a first power supply portion, wherein the main signal processing portion comprises a universal interface unit, a digital audio processing unit, a multichannel analog input unit, a multichannel Analog-to-Digital Converter (ADC), a first high speed multiway switch, and a second high speed multiway switch; the universal interface unit comprises a coaxial input interface, a surface panel optical fiber input interface, a rear panel optical fiber input interface, Audio Engineering Society (AES)/European Broadcasting Union (EBU) digital input interface, Bluetooth® antenna, Universal Serial Bus (USB) input interface and TYPE-C input interface; the digital audio processing unit comprises a digital audio receiving module and an asynchronous sampling rate conversion module; an output end of the multichannel analog input unit is connected to an input end of the multichannel ADC; control ports of the first single chip portion are respectively connected to control ports of the TYPE-C input interface, the digital audio receiving module, the asynchronous sampling rate conversion module, and the 5G wireless transmitting portion; the LED indicating and displaying panel portion and the first power supply portion are respectively connected to the first single chip portion; the coaxial input interface, the surface panel optical fiber input interface, the rear panel optical fiber input interface, the AES/EBU digital input interface and the TYPE-C input interface are respectively connected to an input interface of the digital audio receiving module; the Bluetooth® antenna and an output interface of the digital audio receiving module are simultaneously connected to the first high speed multiway switch; the USB input interface has two signal output ends, one of which is connected to the first high speed multiway switch, and another one of which is connected to the asynchronous sampling rate conversion module; an output end of the asynchronous sampling rate conversion module and an output end of the multichannel ADC are simultaneously connected to the second high speed multiway switch; an output end of the second high speed multiway switch is connected to the 5G wireless transmitting portion;

each of the multiple receivers comprises a 5G wireless receiving portion, a digital/analog conversion and power amplifying portion, a second single chip portion, a LED indicating panel portion, and a second power supply portion; the digital/analog conversion and power amplifying portion comprises a third high speed multiway switch, a digital/analog signal converter with volume control, a low speed filter buffer unit, an analog switch, a power amplification module, a Radio Corporation of America (RCA) single-end analog signal output interface, an External Line Return (XLR) balanced analog audio input interface and a speaker; the 5G wireless receiving portion is wirelessly connected to the 5G wireless transmitting portion via a 5 GHz signal; the 5G wireless receiving portion is connected to the digital/analog signal converter with volume control; an analog volume output interface of the digital/analog signal converter with volume control is connected to the low speed filter buffer unit; the low speed filter buffer unit has two output ends, one of which is connected to the RCA single-end analog signal output interface, and another one of which and the XLR balanced analog audio input interface are simultaneously connected to the analog switch; an output end of the analog switch is connected to the power amplifying module; a speaker output interface of the power amplifying module is connected to the speaker; control ports of the second single chip portion are respectively connected to control ports of the 5G wireless receiving portion and the digital/analog conversion and power amplifying portion; the LED indicating panel portion and the second power supply portion are respectively connected with the second single chip portion.

2. The 5 GHz multichannel lossless wireless audio system of claim 1, wherein the USB input interface is a USB 2.0 interface or a USB 3.0 interface.

3. The 5 GHz multichannel lossless wireless audio system of claim 1, wherein the 5G wireless transmitting portion comprises a baseband portion, a digital cache portion, a 5 GHz radio frequency portion, and 5 GHz duplex dual antenna transmission signals.

4. The 5 GHz multichannel lossless wireless audio system of claim 1, wherein the multichannel analog input unit comprises a multichannel analog interface and a buffer amplifier.

5. The 5 GHz multichannel lossless wireless audio system of claim 1, wherein the first single chip portion comprises a first system control microprocessor, and a 2/8Channel (CH) switch, an infrared remote control unit and a first remote control interface connected respectively to the first system control microprocessor.

6. The 5 GHz multichannel lossless wireless audio system of claim 1, wherein the LED indicating and displaying panel portion comprises a status display unit and a volume control and display unit, wherein the status display unit is connected to the first single chip portion; the volume control and display unit comprises a volume knob, a shift register, and an LED digital display screen; the volume knob is connected to the first single chip portion; the shift register and the LED digital display screen are connected to the first single chip portion through the shift register.

7. The 5 GHz multichannel lossless wireless audio system of claim 1, wherein the Bluetooth® antenna is connected to the first high speed multiway switch through a Bluetooth® module; the USB input interface is respectively connected to the first high speed multiway switch and the asynchronous sampling rate conversion module through a USB interface conversion chip.

8. The 5 GHz multichannel lossless wireless audio system of claim 1, wherein the power amplification module has a power of 200 W.

9. The 5 GHz multichannel lossless wireless audio system of claim 1, wherein the second single chip portion comprises a second system control microprocessor, and a local attenuation control unit, a channel setting unit, a human-machine interaction component, an infrared remote control receiving interface, an infrared remote control switch, a 12V output switch control unit and a second remote control interface respectively connected to the second system control microprocessor, wherein the infrared remote control switch is connected to the infrared remote control receiving interface.

10. The 5 GHz multichannel lossless wireless audio system of claim 1, wherein the LED indicating panel portion comprises a 48-192 khz sampling rate indicating unit and a wireless signal indicating unit simultaneously connected to the second single chip portion.

* * * * *